United States Patent [19]

Bosshart

[11] Patent Number: 4,754,421
[45] Date of Patent: Jun. 28, 1988

[54] MULTIPLE PRECISION MULTIPLICATION DEVICE

[75] Inventor: Patrick W. Bosshart, Dallas, Tex.

[73] Assignee: Texas Instruments Incorporated, Dallas, Tex.

[21] Appl. No.: 773,150

[22] Filed: Sep. 6, 1985

[51] Int. Cl.[4] .................................................. G06F 7/52
[52] U.S. Cl. ..................................... 364/757; 364/754
[58] Field of Search .................... 364/754, 757–760, 364/736

[56] References Cited

U.S. PATENT DOCUMENTS 4,215,416  7/1980  Muramatsu .......................... 364/736

FOREIGN PATENT DOCUMENTS 0059245  4/1982  Japan ................................. 364/757
0137045  8/1983  Japan ................................. 364/754
86/02181  4/1986  PCT Int'l Appl. ................... 364/754

OTHER PUBLICATIONS

"Unit Multiplies in 45 ns", Electronics, vol. 53, No. 5, Feb. 18, 1980, p. 202.
Iwamura et al., "A 16-bit CMOS/SOS Multiplier-Accumulator", IEEE International Conf. on Circuits & Comp. (ICCC), Sep. 29, 1982, pp. 151–154.
"Pipelined Hardware Multiplier with Extented Precision", IBM Tech. Disclosure Bull., vol. 23, No. 9, Feb. 1981, pp. 4322–4323.
"Very Low Power, Fast Array Multiplier", IBM Tech. Disclosure Bull., vol. 28, No. 6, Nov. 1985, pp. 2481–2483.
Anon, "16× 16-Bit Multipliers Meet Military/Commercial High Speed Applications", Computer Design, vol. 15, No. 8, p. 50, Aug. 1976.

Primary Examiner—Gary V. Harkcom
Assistant Examiner—Tan V. Mai
Attorney, Agent, or Firm—Kenneth C. Hill; Thomas W. Demond; Melvin Sharp

[57] ABSTRACT

A multiple precision multiplication device includes accumulators coupled to the output of an array multiplier. The accumulators store partial products which are then added back into partial products generating during succeeding multiplication steps. The final product is output from the accumulators only after all partial products have been added in.

3 Claims, 1 Drawing Sheet

MULTIPLE PRECISION MULTIPLICATION DEVICE

BACKGROUND AND SUMMARY OF THE INVENTION

The present invention relates generally to computing devices, and more specifically to a single chip high-speed multiplication device.

High speed multiplication of binary numbers generally involves the use of an array multiplier, which can multiply two numbers in a small number of gate delays. However, multiplication of multiple precision numbers, which are numbers larger than the word width of the multiplier, involves storage and summation of numerous partial products. These must be stored until they can be added to later generated partial products, with the whole process generally taking a much longer time than single precision multiplication. In addition, different parts of the multiple precision input values must be presented to the multiplier in order to generate the desired partial products.

Current multiple precision multiplication schemes are expensive because of the sometimes excessive amount of hardware required, and often relatively slow.

It is therefore an object of the present invention to provide a single-chip multiplication device capable of multiple precision multiplication, which is fast and does not require expensive off-chip hardware. It is an object of the present invention that such multiple precision multiplication device be capable of accomplishing double precision multiplication in only four clock cycles, which is the minimum possible.

The novel features which characterize the present invention are defined by the appended claims. The foregoing and other objects and advantages of the invention will hereinafter appear, and for purposes of illustration, but not limitation, a preferred embodiment is shown in the drawings.

DESCRIPTION OF THE PREFERRED EMBODIMENT

A multiple precision multiplication device must be able to generate results from inputs having a longer length than the word length of the multiplier and multiplicand. For example, in a computer system using 16 bit word lengths, a single precision multiplier gives 32 bit results. In the same 16 bit system, a double precision multiplier must multiply 32 bit words and give a 64 bit result.

Figure 1:
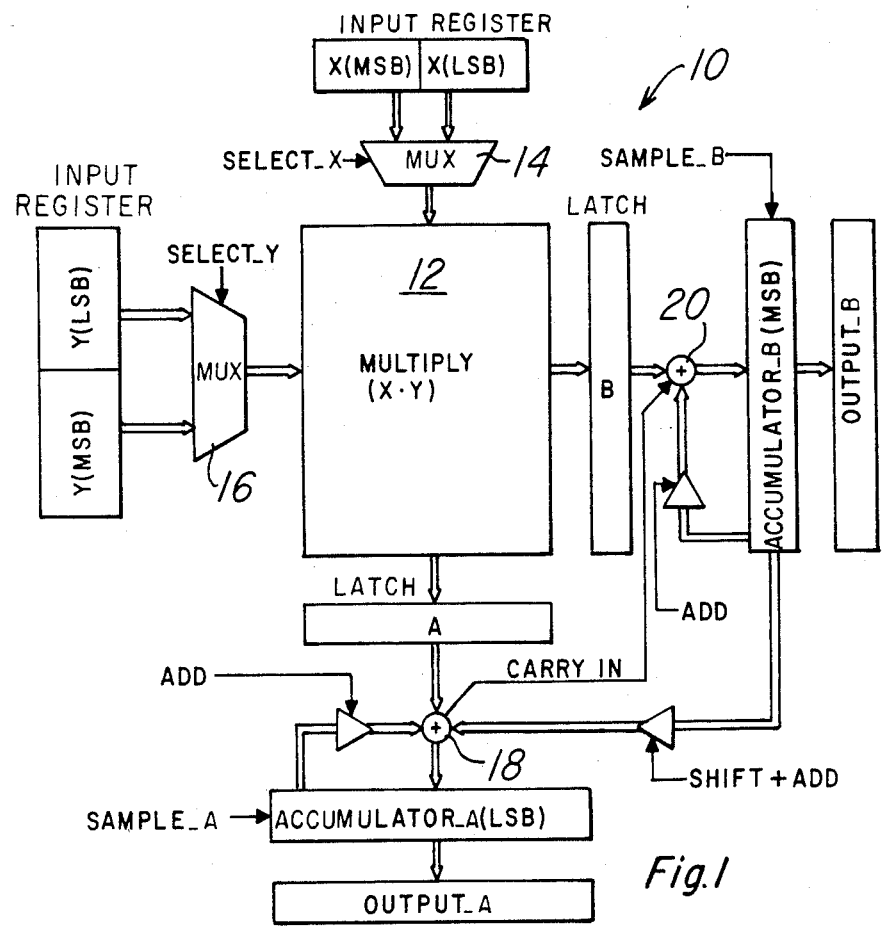
FIG. 1 is a schematic block diagram of a multiple precision multiplication device according to the present invention.

Referring to FIG. 1, a multiplication device is shown which includes ADD and SHIFT+ADD circuitry coupled to the outputs of a multiplier array. This multiple precision multiplication device is capable of being easily incorporated on a single chip, so that no external circuitry is needed to perform a multiple precision multiplication. In addition, this device can multiply two double-precision numbers in four clock cycles, which is the minimum possible number of cycles. As shown in FIG. 1, 16 bit word widths are used, so that a double precision multiply operation multiplies two 32 bit words and gives a 64 bit result. However, this multiplier can easily be designed to handle 8 bit or 32 bit word widths.

The double precision numbers to be multiplied each have a most significant part and a least significant part, each such part being 16 bits long. Assuming X and Y are to be multiplied, the most significant part of X is stored in the register X(MSB), with the least significant part of X being stored in X(LSB). Y is stored in the registers Y(MSB) and Y(LSB). Although registers are shown in FIG. 1, the use of actual hardware registers is not necessary. Any means of presenting data controlled by SELECT X and SELECT Y can be used.

The most and least significant parts of X and Y are alternately coupled to an array multiplier 12 through an X multiplexer 14 and a Y multiplexer 16 controlled by the signals SELECT X and SELECT Y. If SELECT X is low, the least significant part of X is selected, and the most significant part of X is selected when SELECT X is high. The same goes for the selection of the double precision number Y through the Y multiplexer 16 by SELECT Y. As described above, it is not required that multiplexers be used as shown if FIG. 1. It is only necessary to present the LSB and MSB of X and Y based on control signals such as SELECT X and SELECT Y. The array multiplier 12 is a standard type found in high speed multipliers. The output of the array multiplier 12 is shown as split into a most significant part, sent to output buffer B, and a least significant part, sent to output buffer A. Multiply output buffers A and B may be simple latches or pipeline registers. Preferably, carry-save adders are used throughout the multiply array, with the carries resolved imediately before the ACCUMULATORS. It is also preferred that look ahead carries be used to further speed the multiply operation.

The least significant product is in buffer A and is coupled to ACCUMULATOR A through a summing circuit 18, OUTPUT A reflects the contents of ACCUMULATOR A when the signal SAMPLE A is a logical one. Likewise, the most significant part of the array multiplier output is in buffer B, and is coupled to ACCUMULATOR B through a summer 20. The contents of ACCUMULATOR B are reflected in OUTPUT B when the signal SAMPLE B is a logical one. ACCUMULATOR B is usually longer than 16 bits, for example 19 bits, to hold carry bits generated by add operations. Carry bits generated in ACCUMULATOR A are coupled into adder 20 as a carry in bit.

When the signal ADD is a logical one, the values currently in ACCUMULATOR A and ACCUMULATOR B are input to the adders 18 and 20. These values are added to other incoming values and the result is stored in ACCUMULATOR A and ACCUMULATOR B. When the signal SHIFT+ADD is a logical one, the 16 LSB's stored in ACCUMULATOR B are input to adder 18 to be added with another value and stored in ACCUMULATOR A. Then ACCUMULATOR B is arithmetically downshifted 16 bits, and added to the value in B.

A single precision multiply operation using the device described above is straightforward. The values to be multiplied are loaded into the X(LSB) and Y(LSB) registers. These registers can be located separately from the multiplication chip, or incorporated thereon. For a single precision multiply, it is not even necessary to have Y and X act as registers, but they can merely act as input buffers for signal presented from off chip. The signals SELECT X and SELECT Y are both set to logical zero in order to select the values located in the least significant parts of X and Y. The array multiplier presents a 32 bit product at B and A within a few gate delays, with the most significant part in B. The signals ADD and SHIFT+ADD are both logical zero, so that the values read in A and B are transferred directly to ACCUMULATOR A and ACCUMULATOR B respectively. The signals SAMPLE A and SAMPLE B are set to a logical one so that the value stored in the ACCUMULATORS are immediately transmitted to OUTPUT A and OUTPUT B. Thus, in one clock cycle, a single precision multiply gives a 32 bit result located in the two 16 bit registers OUTPUT B and OUTPUT A, with OUTPUT B holding the most significant part.

A multiple precision multiply using the above device requires four clock cycles for the multiply operation. The numbers to be multiplied, X and Y, are loaded into the X and Y input registers. As described, these input registers are divided into most significant and least significant parts.

To perform a double precision multiply operation, various partial products must be summed. Table I shows a listing of the eight partial products generated during the multiply operation, and Table II shows which partial products must be added together to obtain a final result.

TABLE I

| | |
|---|---|
| $a = (X_L \times Y_L)_L$ | $e = (X_L \times Y_M)_L$ |
| $b = (X_L \times Y_L)_M$ | $f = (X_L \times Y_M)_M$ |
| $c = (X_M \times Y_L)_L$ | $g = (X_M \times Y_M)_L$ |
| $d = (X_M \times Y_L)_M$ | $h = (X_M \times Y_M)_M$ |

TABLE II

| |
|---|
| $X_M X_L$ |
| $\times\ Y_M Y_L$ |
| ba |
| dc |
| fe |
| hg |
| result |

In Table I, the notations $X_L$ and $X_M$ are the least significant and most significant parts of X, respectiely, and $Y_L$ and $Y_M$ are the least significant and most significant part of Y, respectively. The notations (———)$_L$ and (———)$_M$ are the least significant and most significant parts of a product, respectively.

In Table II, four separate 16 bit parts of the 64 bit result are as follows:
  least significant 16 bits = a
  next least significant 16 bits = (b+c+e)+carryin
  next most significant 16 bits = (d+f+g)+carryin
  most significant 16 bits = h+carryin The carry-ins represent any carries which are generated by the summation resulting in the previous less significant 16 bits.

Figure 2:
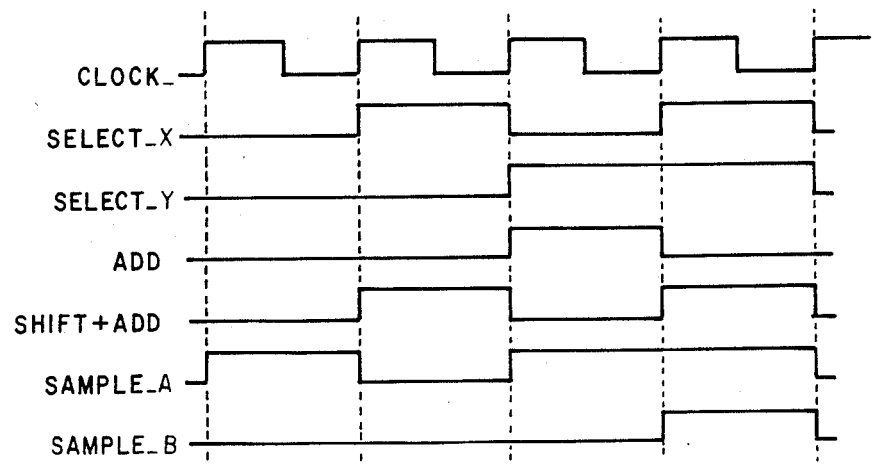
FIG. 2 is a timing diagram for the device of FIG. 1 when used in multiple precision mode.

Referring to FIGS. 1 and 2, the method in which FIG. 1 implements the addition of partial products as shown above in Table II is now described. In FIG. 2, a high state for a signal corresponds to a logical 1, and a low state for a signal corresponds to a logical 0.

During the first clock cycle, SELECT X and SELECT Y are low, thereby selecting the least significant part, (16 bits) of both X and Y. The signals ADD and SHIFT+ADD are both low, so that after one clock cycle ACCUMULATOR A and ACCUMULATOR B are loaded with the result of the multiplication of the least significant parts of X and Y. That is, ACCUMULATOR A holds the partial product a, and ACCUMULATOR B holds the partial product b. The signal SAMPLE A is high, indicating that the partial product just loaded into ACCUMULATOR A is also available in the output buffer OUTPUT A. This value is the least significant 16 bits of the final product, shown as a in Table I. SAMPLE B is low, indicating that no value is held in OUTPUT B.

On the second clock cycle, SELECT X goes high, so that the most significant part of X is multiplied with the least significant part of Y. Partial products c and d are found in multiply buffers A and B respectively. ADD is low and SHIFT+ADD is high, indicating that the partial product b previously stored in ACCUMULATOR B is added to the new partial product C found in buffer A, with the sum being stored in ACCUMULATOR A. As reflected in Table 1, this is the summation of the partial products b and c. ACCUMULATOR B is downshifted by 16 bits, then added to partial product d, which is found in buffer B. Both SAMPLE A and SAMPLE B are low, indicating that there are no valid output values on this clock cycle.

During the third clock cycle, SELECT X goes low and SELECT Y goes high, so that the most significant part of Y is multiplied with the least significant part of X. SHIFT+ADD is low and ADD is high, so that the values previously stored in ACCUMULATOR A and ACCUMULATOR B are added to the new partial products from the multiply operation, and stored back into their respective ACCUMULATORS. The Table I partial products which now exist in multiply buffers A and B are e and f respectively. Thus, during the third clock cycle, ACCUMULATOR A holds the value (b+c+e), and ACCUMULATOR B holds the value (d+f). SAMPLE A is high, since the value now in ACCUMULATOR A represents the next least significant 16 bits of the final product. This value is therefor now available in the buffer OUTPUT A.

During the fourth clock cycle, SELECT X goes high, so that the most significant parts of both X and Y are being multiplied. This gives the Table I partial products g and h in multiplier buffers A and B respectively. ADD is low but SHIFT is high, so that at the end of the fourth clock cycle, the value in ACCUMULATOR A is (d+f+g), where d and f were previously stored in ACCUMULATOR B. ACCUMULATOR B is arithmetically downshifted 16 bits, and added to partial product h. Since the values in B and A respectively are the most significant and next most significant parts of the product, both SAMPLE A and SAMPLE B are high.

Thus, after four clock cycles, the entire double precision product has been made available in the output buffers OUTPUT A and OUTPUT B.

A straightforward extension of the scheme described above can be used to accomplish quadruple or other multiple precision multiplies. It is merely necessary to change the timing and number of ADDS and SHIFT+ADDS, and to ensure that enough extra carry bits are provided in ACCUMULATOR B.

In designing a single chip multiplication device, the various parts thereof can be laid out on the chip substantially as shown in FIG. 1. The data path from ACCUMULATOR B to ACCUMULATOR A can cross back over the multiplier array 12 in order to simplify routing.

This results in a compact chip which is fairly simple to lay out.

The described one chip multiplier shows a device for multiplying double precision numbers in only four clock cycles. In addition, off chip hardware for manipulating partial products is eliminated and the overall speed of the multiplication device is improved.

The present invention has been illustrated by the circuitry described above, and it will become apparent to those skilled in the art that various modification and alterations may be made thereto. Such variations fall within the spirit of the present invention, the scope of which is defined by the appedned claims.

What is claimed is:

1. A multiple precision clocked multiplication device, comprising:

first and second inputs each having most significant and least significant parts;
   a multiplier;
   first and second selectors coupled to said multiplier and to said first and second inputs, respectively, for selectively coupling the most significant and least significant parts thereof to said multiplier;
   a most significant and a least significant accumulator coupled to said multiplier;
   a plurality of output lines coupled to said accumulators;
   adders coupled to said accumulators; and
   control circuitry coupled to said selectors, said accumulators, and said adders for causing selected partial products from said multiplier to be added together in said accumulators prior to coupling the values stored in said accumulators to said output lines.

2. The multiple precision multiplication device of claim 1, wherein the multiplication device is a double precision multiplication device.

3. A clocked multiplication device for multiplying two double precision numbers in four clock cycles, comprising;

first and second inputs each having equal length most significant and least significant parts;
   a multiplier having a most significant output part and a least significant output part;
   first and second selectors coupled to said first and second inputs respectively for selectively coupling the most and least significant parts of said inputs to said multiplier;
   a most significant accumulator;
   a least significant accumulator;
   a most significant and a least significant adder coupled to said most and least significant accumulators, respectively; and
   control circuitry coupled to said selectors, said accumulators, and said adders, wherein said control circuitry causes the least significant part of the first input to be coupled to the multiplier during a first and second clock cycle and the most significant part of the first input to be coupled to the multiplier during a third and fourth clock cycle, causes the second input least significant part to be coupled to said multiplier during the first and third clock cycles and the least significant part to be so coupled during the second and fourth clock cycles, causes the contents of the most significant accumulator to be added to the least significant accumulator on the second and fourth clock cycles, causes the output of the multiplier most and least significant parts to be added to the previous contents of the most and least significant accumulators, respectively, causes the outputs from the multiplier to be loaded into their respective accumulators on the first clock cycle, causes the contents of the least significant accumulator to be output on the first, third and fourth clock cycles, and causes the contents of the most significant accumulator to be output on the fourth clock cycle.

* * * * *